Patented June 7, 1949

2,472,252

UNITED STATES PATENT OFFICE 2,472,252

PROCESS FOR THE PRESERVATION OF BEER

Arthur Henry Hughes, Dublin, Eire, assignor to Messrs. Arthur Guinness Son and Company Limited, Dublin, Eire No Drawing. Application February 26, 1946, Serial No. 650,379. In Great Britain March 26, 1945

2 Claims. (Cl. 99—48)

This invention relates to the preservation of beer, which term as used herein includes both ale and stout.

It is an object of the present invention to provide a process which will improve the keeping qualities of beer without detrimentally influencing its taste.

With this object in view the present invention provides a process for the preservation of beer wherein a small proportion of egg-white or of an egg-white concentrate is added to the beer after it leaves the fermenting vessel and before bottling. It is generally convenient to make the addition at the racking stage.

In general we have found that a proportion of between 0.02% and 0.2% by volume of egg-white, calculated on the beer, is sufficient. Although somewhat larger proportions are not detrimental they are in general unnecessary and uneconomic. When an egg-white concentrate, e. g. dehydrated egg-white, is used the proportion will, of course, be correspondingly smaller.

The egg-white may be conveniently obtained from hen eggs or duck eggs.

Table I below shows the great advantages of the invention, the columns marked "control" relating to parallel experiments in which no egg-white was added but stout from the same vat was used:

The acidities of two stouts bottled after seven days in cask to which 0.041% by volume of hen egg-white had in each case been added according to the present invention were compared with the acidities of the same stouts to which no egg-white had been added but which in every other respect were treated in the same way.

The results are shown in Table II.

Table II

| Days after racking | Acidity | | | |
|---|---|---|---|---|
| | Stout A | | Stout B | |
| | 0.041% by vol. egg-white added | Control | 0.041% by vol. egg-white added | Control |
| 0 | .100 | .100 | .087 | .087 |
| 7 (bottling) | .107 | .111 | .091 | .100 |
| 14 | .110 | .113 | .095 | .113 |
| 21 | .110 | .113 | .093 | .104 |
| 28 | .110 | .114 | .090 | .100 |
| 35 | .106 | .116 | .089 | .112 |
| 42 | .110 | .139 | .104 | .136 |
| 49 | .113 | .149 | .118 | .164 |
| 56 | .122 | .164 | .148 | .180 |
| 63 | .134 | .179 | .168 | .193 |
| 70 | .141 | .181 | | |
| 77 | .146 | .186 | | |
| 84 | .156 | .190 | | |

Table I

| Per cent by volume of egg-white added to stout | Life[1] (in days) | | | | Fall in gravity from Racking (bottle) | | | |
|---|---|---|---|---|---|---|---|---|
| | In cask | | In bottle | | 21 days | | 35 days | |
| | Egg-white added | Control | Egg-white added | Control | Egg-white added | Control | Egg-white added | Control |
| 0.041 (Hen egg-white) | 74.6 | 42.5 | 83.3 | 51.9 | 3.3 | 3.3 | 3.9 | 4.0 |
| Do | 74.4 | 53.5 | 58.4 | 46.8 | 2.5 | 2.5 | 2.7 | 2.8 |
| 0.164 (Hen egg-white) | 49.5 | 33.7 | 53.2 | 42.3 | 3.0 | 3.0 | 3.6 | 4.0 |
| 0.164 (Duck egg-white) | 47.3 | 39.1 | 61.6 | 43.9 | 4.1 | 4.1 | 4.4 | 4.8 |

[1] Life is the time taken for the stout to reach a given acidity.

It was found that the addition of the egg-white in the proportions referred to above had increased the life of the treated stout by 25% to 75%; had no detrimental effect on the flavour of the stout, and had little effect on the fermentation.

I claim:

1. A process for the restriction of acidification of beer which comprises the step of adding a small proportion of egg-white to the beer during the racking stage.

2. A process for restricting the acidification of beer and thereby increasing its potable life which comprises the step of adding between 0.02% and 0.2% by volume of egg-white calculated on the beer to the beer at the racking stage.

ARTHUR HENRY HUGHES.

REFERENCES CITED

The following references are of record in the file of this patent:

UNITED STATES PATENTS

| Number | Name | Date |
|---|---|---|
| 201,982 | Bartholomae | Apr. 2, 1878 |
| 2,128,432 | Ramage | Aug. 30, 1938 |

OTHER REFERENCES

"Coffee, The Beverage," by F. N. Foot, pub. 1925 by The Spice Mill Publishing Co., New York, N. Y., page 113.

"Wines and Liquors," by K. M. Herstein & T. C. Gregory, published 1935 by D. Van Nostrand Co., Inc., New York, N. Y., page 178.

"Brennerei-Lexikon," by Dr. Max Debruck, published 1915 by Verlgsbuchhandlung Paul Parey, Berlin, Germany, page 428, right column.